(12) United States Patent
Goodman et al.

(10) Patent No.: US 6,958,995 B1
(45) Date of Patent: Oct. 25, 2005

(54) NON-BLOCKING HIGH CAPACITY FINE GRAIN SWITCH

(75) Inventors: David M Goodman, St Albans (GB); Kim B Roberts, Nepean (CA)

(73) Assignee: Nortel Networks Limited, St. Laurent (CA)

( * ) Notice: Subject to any disclaimer, the term of this patent is extended or adjusted under 35 U.S.C. 154(b) by 990 days.

(21) Appl. No.: 09/754,041

(22) Filed: Dec. 29, 2000

(51) Int. Cl.[7] .......................... H04L 12/50; H04L 12/28
(52) U.S. Cl. ....................... 370/358; 370/386; 370/391
(58) Field of Search ................................ 370/357, 358, 370/359, 386, 391

(56) References Cited

U.S. PATENT DOCUMENTS 6,041,055 A * 3/2000 Chopping .................... 370/391
6,249,520 B1 * 6/2001 Steely et al. ................. 370/368

* cited by examiner

Primary Examiner—Chau Nguyen
Assistant Examiner—Andrew Wahba
(74) Attorney, Agent, or Firm—Barnes & Thornburg

(57) ABSTRACT

A high capacity switch for switching communications traffic. The high capacity switch has a plurality of differing granularity switching levels, each switching level having at least one switch node capable of performing a switching operation at the granularity of the switching level and at least two primary connections, each connecting one of the switching levels to another one of the switching levels. At one of the switching levels, at least one switch node is capable of switching communications traffic along at least one switch connection path established along one of the primary connections, and is also capable of switching communications traffic along at least one secondary connection to another switch node within the same switching level, such that each of the at least one switch connection paths established is filled to a predetermined level.

39 Claims, 8 Drawing Sheets

NON-BLOCKING HIGH CAPACITY FINE GRAIN SWITCH

BACKGROUND TO THE INVENTION

This invention relates to a non-blocking high capacity fine grain switch for use in a communications network, and to a communications network incorporating such a switch. The invention further relates to method of a controlling traffic in such a switch, and to a switch node incorporated in such a switch. The invention is particularly but not exclusively suitable for use in a telecommunications environment.

Photonic switches, such as can be implemented by microelectromechanical (MEMS) devices, are an example of high bandwidth cross-connects which performing coarse granularity switching. Such switches enable the entire signal carried along an optical fiber to be switched to another optical fiber. For example, a thousand port photonic cross-connect receiving signals along each port at 1 Tbit/s can switch a traffic stream having a bandwidth of 1000 Tbit/s. However, the switching granularity of 1 Tbit/s is particularly coarse and has limited applications. Such switches do not support the switching of smaller bandwidth, or fine granularity, traffic.

The SONET (Synchronous Optical Network) standard defined by ANSI (American National Standards Institute) and the SDH (Synchronous Digital Hierarchy) standard defined by the ITU-T (International Telecommunications Union Telecommunications Standardization Sector) each specify a hierarchy of payload units. In SONET, the basic unit is an STS-1, offering a bandwidth of approximately 50 Mbit/s. In SDH, the basic unit is an AU-4, offering a bandwidth of approximately 150 Mbit/s.

Within the SDH and SONET standards, smaller bandwidth data structures can be incorporated and/or multiplexed into larger bandwidth structures. For example, within SDH channels with smaller bandwidths can be provided by, for example, VC-12 (approximately 2 Mbit/s) and VC-3 (approximately 50 Mbit/s). VC-12 and VC-3 channels are known as lower order data structures or lower order containers. Lower order containers are carried within higher order data structures or higher order containers such as VC-4. The VC-4's are then multiplexed to higher data rates. Similar data structure hierarchies exist within SONET. In both SONET and SDH environments therefore, the extraction and insertion of lower order data structures, or fine granularity traffic, to broader bandwidth traffic streams is known.

The capacity of fine granularity switches for switching traffic is generally much less than the capacity of coarse granularity switches such as photonic cross-connects. For example, a fine grain granularity SONET/SDH cross-connect is the SDH 4/1 cross-connect which has a switching granularity of one SDH VC-12. However, the size of the SDH 4/1 is limited and is unlikely to exceed 2000 STM-1 ports or a total bandwidth of 300 Gbit/s. Enhancing known fine granularity switches to have a capacity of 100's of Gbit/s generates bulky switches which can use up tens of racks of equipment. Fine granularity switches known in the art are unlikely to exceed 300 Gbit/s.

Simply combining several fine granularity switches together to form a larger capacity switch is not feasible as most such switches will be blocking. A combination of switches capable of providing both fine grain and coarse grain switching functions to form a large capacity switch such as FIG. 2 of the accompanying drawings does not provide a practical solution either as the switch formed can still be blocking in the manner described in more detail later.

It is highly desirable, particularly in the telecommunications environment, to provide a switch having a capacity large enough to be able to switch large bandwidth traffic yet which has the ability to switch fine grain (narrow bandwidth) traffic on demand. It is therefore advantageous if a switch can be provided which supports a switching operation over a plurality of different switching granularities, or different granularity switching levels. Such a switch can be conceptually perceived to have a layered structure. The central or core switching layer providing the coarsest granularity switching operation and each subsequent layer providing a finer granularity switching operation than the layer before. This layered architecture may or may not be reflected in the physical structure of the switch. It is extremely important that the architecture of any large bandwidth switch providing a fine granularity (narrow bandwidth) switching operation permits the switch to be suitably non-blocking.

SUMMARY OF THE INVENTION

One object of the invention seeks to obviate and/or mitigate the above problems known in the art by providing a non-blocking high capacity fine grain switch for use in a communications environment.

Another object of the invention seeks to provide a method of controlling traffic in a non-blocking high capacity fine grain switch.

Another object of the invention seeks to provide a communications network including a non-blocking high capacity fine grain switch.

Yet another object of the invention seeks to provide a switch node forming part of a non-blocking high capacity fine grain switching.

A first aspect of the invention seeks to provide a high capacity switch for switching communications traffic, the high capacity switch having:

a plurality of differing granularity switching levels, each switching level having at least one switch node capable of performing a switching operation at the granularity of the switching level;

at least two primary connections, each connecting one of the switching levels to another one of the switching levels, wherein at one of the switching levels, at least one switch node is capable of switching communications traffic along at least one switch connection path established along one of the primary connections, and is capable of switching communications traffic along at least one secondary connection to another switch node within the same switching level, such that each of the at least one switch connection paths established is filled to a predetermined level.

Preferably, the pre-determined level is the maximum traffic capacity of the switch connection path.

Advantageously, each at least one secondary connection is configured to have a traffic capacity so that the high capacity switch is non-blocking.

Preferably, at least one secondary connection comprises a permanent connection.

More preferably, every secondary connection comprises a permanent connection.

Preferably, one of the switching levels which performs the coarsest granularity switching operation has one switch node.

Each switch node in one of the switching levels may comprise a plurality of switches, each switch being capable of operating at the granularity of the one of the switching levels.

Preferably, the traffic capacity of the at least one secondary connection in a first one of the switching levels is determined by the capacity of the at least one switch connection path to a second, coarser, one of the switching levels which is capable of providing a coarser granularity switching operation than the first one of the switching levels.

Preferably, the traffic capacity of the at least one secondary connection in a first one of the switching levels is substantially the same as the capacity of the at least one switch connection path to a second one of the switching levels which is capable of providing a coarser granularity switching operation than the first one of the switching levels.

Preferably, the traffic capacity of the at least one secondary connection in a first one of the switching levels is larger than the capacity of the at least one switch connection path to a second one of the switching levels which is capable of providing a coarser granularity switching operation than the first one of the switching levels.

The high capacity switch according to the first aspect of the invention may have two differing granularity switching levels.

Alternatively, the high capacity switch according to the first aspect of the invention may have three differing granularity switching levels.

Alternatively, the high capacity switch according to the first aspect of the invention may have more than three differing granularity switching levels.

In the specific embodiment of the invention where the high capacity switch according to the first aspect of the invention has two differing granularity switching levels, the traffic capacity of the at least one secondary connection in a one of the switching levels providing a finer granularity switching operation may be approximately equal to the granularity of a switching operation in a one of the switching levels providing a coarser granularity switching operation.

In the specific embodiment of the invention where the high capacity switch according to the first aspect of the invention has three different granularity switching levels, the traffic capacity of the at least one secondary connection in one of the switching levels providing a finest granularity switching operation may be approximately equal to the granularity of a switching operation in one of the switching levels providing an intermediate granularity switching operation, and the traffic capacity of the at least one secondary connection in the one of the switching levels providing an intermediate granularity switching operation may be approximately equal to the granularity of the switching operation of in one of the switching levels providing a coarsest granularity switching operation.

The high capacity switch according to the first aspect of the invention may be capable of switching traffic which is coarser than the granularity of the switching operation provided by a switch node in a first one of the switching levels by routing traffic through to a second one of the switching levels which is capable of providing a coarser granularity switching operation than the operation provided by the first one of the switching levels.

Preferably, at least one switch node of a one of the switching levels which provides the coarsest granularity switching operation is capable of establishing at least one secondary connection between a pair of switch nodes in a second one of the switching levels which provides a finer granularity switching operation.

At least one secondary connection may be provided externally to a one of the switching levels which provides the coarsest granularity switching operation.

The switch node of a one of the switching levels which provides the coarsest granularity switching operation may include an optical switch.

The switch node of a one of the switching levels which provides the coarsest granularity switching operation may be transparent to the type of traffic.

The high capacity switch may be capable of switching both time division multiplexed traffic and wavelength multiplexed traffic.

The high capacity switch may be capable of switching SONET/SDH traffic.

The high capacity switch may be capable of switching both SONET/SDH and wavelength traffic.

At least one switch node may be capable of switching a lower order SDH/SDH virtual container.

At least one switch node may be capable of switching higher order SDH/SDH virtual containers.

At least one switch node may be capable of switching a plurality of higher order SDH/SDH containers.

Preferably, at least one switch node in one of the plurality of switching levels is capable of switching lower order virtual containers, and at least one other switch node in another of the plurality of switching levels is capable of switching higher order virtual containers.

In the specific embodiment of the invention wherein the high capacity switch according to the first aspect of the invention has at least three switching levels, at least one switch node in a first one of the plurality of switching levels may be capable of switching lower order virtual containers, and at least one switch node in a second one of the plurality of switching levels may be capable of switching higher order virtual containers, and at least one switch node in a third one of the plurality of switching levels may be capable of switching a plurality of higher order virtual containers.

The high capacity switch may be distributed over a communications network.

The high capacity switch may be incorporated into a telecommunications network.

A second aspect of the invention seeks to provide a switch of granularity M comprising:

a switch core including a coarse grain switch of granularity N;

a plurality of switch nodes, each switch node comprising at least one fine grain switch of granularity M finer than N, the switch core being capable of establishing a switch connection path with any of the switch nodes; and a plurality of permanent connections, each permanent connection connecting two fine grain switches, wherein the permanent connections are configured to permit the switch to be non-blocking, and wherein a minimum number of switch connection paths are established, the switch connection paths being filled to capacity with traffic routed through the switch and wherein residual traffic is routed along permanent connections.

Preferably, the traffic capacity of each permanent connection between any pair of fine grain switches is substantially equals to the granularity N of the coarse grain switch.

A third aspect of the invention seeks to provide a method of controlling traffic to be routed through a high capacity switch according to the first aspect of the invention, the method comprising the steps of:

assessing traffic received at a switch node in a finer granularity switching level;

at the switch node in the finer granularity switching level, switching traffic capable of filling to capacity an exact number of switch connection paths along a primary connection along the exact number of switch connection paths to a next coarser granularity switching level switch node, and switching residual traffic not capable of filing a switch connection to capacity along a secondary connection to another switch node in the finer granularity switching level; and reconfiguring the number of switch connections established in accordance with any variation in the traffic to ensure that a minimum number of switch connections is always established from the finer granularity switching level to the next coarser granularity switching level.

Preferably, the step of reconfiguring maintains the synchronization of traffic at a destination.

Preferably, the step of reconfiguring uses a hitless technique.

A fourth aspect of the invention seeks to provide a communications network including a high capacity switch for switching communications traffic according to a first aspect of the invention.

A fifth aspect of the invention seeks to provide a switch node forming part of a high capacity switch for switching communications traffic according to the first aspect of the invention.

Any features of the above aspects may be suitably incorporated in any of the above aspects as would be apparent to a person skilled in the art.

Advantageously, the invention provides a high capacity switch in which secondary connections within a switching level are configured so that the switch is not blocked, and so that the high capacity switch is non-blocking as a whole. The invention thus provides a non-blocking high capacity fine grain switch which is capable of adopting a nested hierarchy of switching levels, or switch layers, so as to build up successive levels of switching granularity. Traffic is able to bypass the finer granularity switching level to reach the coarse granularity switching level.

Within each finer switching level, permanent connections are established between the switch nodes. Each switch node in a switching level is capable of establishing a switch connection to at least one, and preferably all switch nodes in the next, finer granularity switching level. The permanent connections of each finer switching level are preferably configured to have a capacity substantially equivalent to a switch connection to the next, coarser, switching level.

This provides the advantage that a non-blocking high capacity fine grain switch can be provided. The switching levels may be "layered" and/or the switch nodes distributed over a communications network. In this manner a distributed switch architecture is provided for a non-blocking high capacity fine grain switch which is capable of routing a large traffic bandwidth yet which retains the ability to switch traffic of finer granularity.

The coarsest granularity switching level may be transparent to data type, so as to enable both TDM and wavelength traffic to be switched. It is also possible for photonic switch(es) to be incorporated into switch node(s) as appropriate. This would enable optical traffic to be routed directly without the need for electro-optical conversion at the switch nodes.

Traffic routed through the high capacity fine grain switch is received by a switch node in the switching level providing the finest granularity switching operation. The progress of traffic through the high capacity switch is assessed by appropriate control elements within the high capacity switch or by network management software:

i) assessing how many switch connection paths the traffic stream has the ability to fill to capacity;

ii) Routing traffic to the switch node(s) in a coarser granularity switching level only along switch connections which are full to capacity;

iii) Routing any residual traffic along a secondary connection to the appropriate destination switch node within the switching level; and iv) Reconfiguring the path of traffic through the switching level(s) as appropriate to ensure that only the minimum number of switch connection paths are maintained.

In this manner, the switch connections are maintained in either a full or an empty state, increasing the probability that the high capacity switch is not blocked, and increasing the efficiency of the switching operation of the coarsest switching level switch node, or switch core.

Traffic along the switch connections and secondary connections can be monitored by any suitable monitoring means, such as are known in the art, and the most efficient route for the traffic through the switch determined. In the case where traffic routed along a secondary connection reaches a predetermined amount, for example, when traffic is capable of filling a switch connection to capacity, the traffic is re-routed along the switch connection. In the case where traffic has been routed along a switch connection falls to a lower predetermined amount, the traffic may be re-routed along a secondary connection leaving the switch connection empty. The reconfiguration is preferably hitless to ensure that traffic is appropriately synchronized at its destination regardless of the route taken through the switch.

BRIEF DESCRIPTION OF THE DRAWINGS

The above objects, advantages and features of the invention will become apparent from the following description, taken in conjunction with the accompanying drawings which are by way of example only and in which.

DETAILED DESCRIPTION OF PREFERRED EMBODIMENTS

There will now be described by way of example the best mode contemplated by the inventors for carrying out the invention. In the following description numerous specific details are set forth in order to provide a thorough understanding of the present invention. It will be apparent however, to one skilled in the art, that the present invention may be practiced without limitation to these specific details. In other instances, well known methods and structures have not been described in detail so as not to unnecessarily obscure the present invention. Numerical examples used are to clarify operation and are not chosen to reflect real equipment sizes or to show an efficient implementation. References to SONET are intended to include references to the SDH equivalent, and vice versa as would be obvious to one skilled in the art.

Figure 1A:
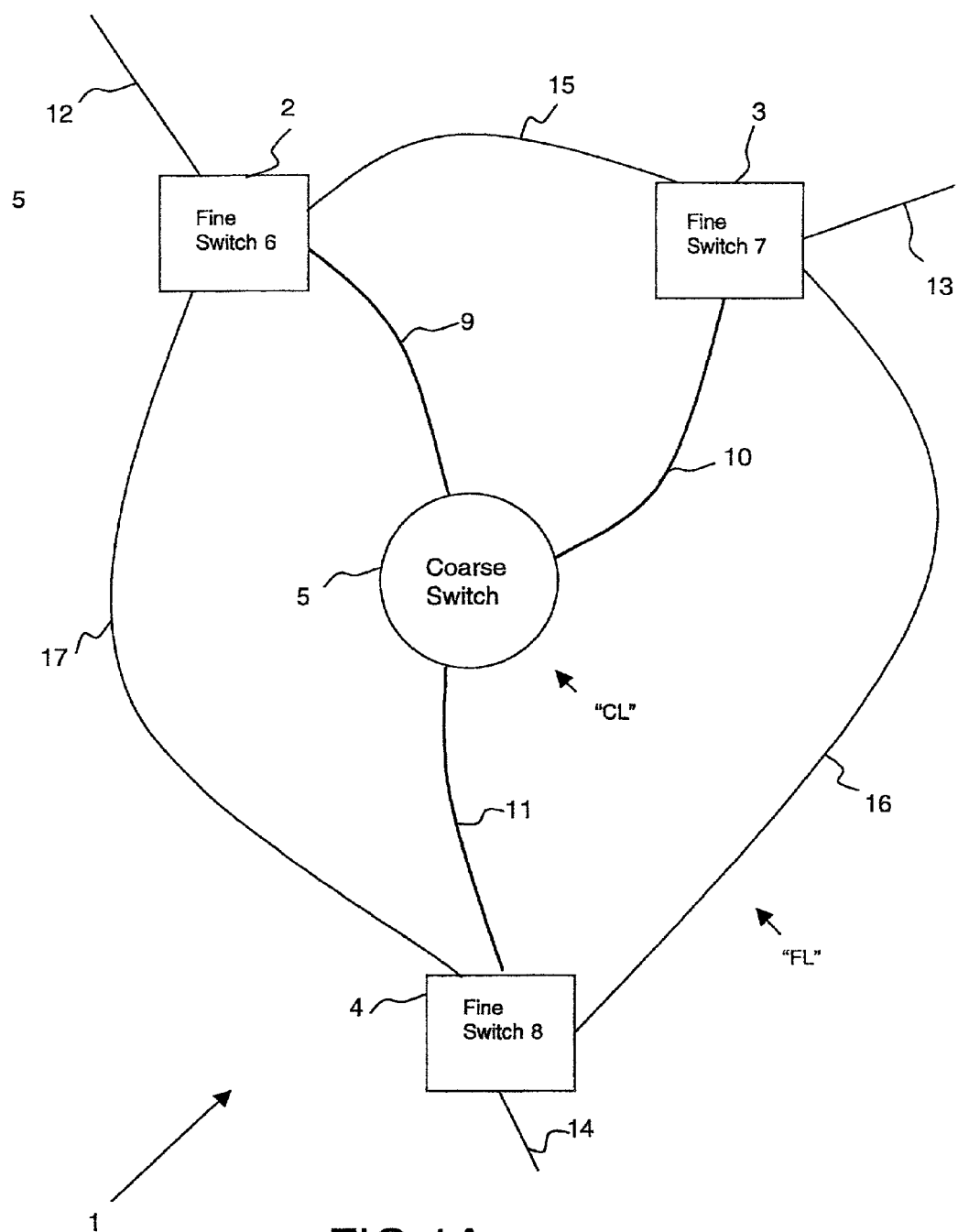
FIG. 1A is a sketch of a high capacity fine grain non-blocking switch according a first aspect of the invention.

FIG. 1A illustrates a high capacity fine grain non-blocking switch 1 according to one embodiment of the invention. In FIG. 1A, different levels of switching are represented by different layers of the switch 1. In FIG. 1A, the high capacity fine grain switch 1 supports two different levels of switching granularity, a first switching level ("CL") which provides a coarse granularity switching operation and a second, outer, switching level ("FL") which provides a finer granularity switching operation than the first layer and which determines the finest bandwidth of traffic which the high capacity fine grain switch is able to switch.

In FIG. 1A, the second granularity switching level "FL" supports switching at granularity "M" (see FIG. 1B), and incorporates three switch nodes 2, 3, 4. Each switch node 2, 3, 4 contains a switch which can switch traffic at the granularity M. Each switch node also enables coarser grain traffic to be routed through to the first switching level.

Alternatively, a switch node can include more than one switch provided these are suitably configured to co-operate.

The coarse switching level "CL" represented by the inner, first layer of the switch includes one switch node 5, which functions as the core of the high capacity fine grain switch 1. Alternative embodiments may include more than one switch node arranged to collectively function as a switch core.

The switch node 5 is capable of performing a switching operation of granularity N, where N is coarser than M. Traffic is received at the switch node 5 only from the second switching level FL by a second level switch node 2, 3, 4. The switch node 5 is able to perform a coarse granularity switching operation on the received traffic at high speeds without any need to extract fine granularity traffic.

Traffic is received by the high capacity switch 1 via the fine granularity switching level FL along a suitably configured port 12, 13, 14 for the appropriate receiving switch node 2, 3, 4. Each external facing port 12, 13, 14 enables traffic in the second, fine granularity, switching level FL to interface to the communications network outside the high capacity fine grain switch.

Each switch node 2, 3, 4 in the fine grain switch level FL also has at least one primary connection port (not shown). The primary connection ports support primary connections 9, 10, 11 with the primary connection ports (not shown in FIG. 1A) of the coarse granularity switching level switch node 5.

Within the fine switching level FL, each switch node 2, 3, 4 is connected by a secondary connection 15, 16, 17 to each of the other switch nodes 2, 3, 4 in the switching level FL. The secondary connections may, for example, be permanent connections, and are permanent connections in the best mode of the invention. The fine switching level is connected to the coarse switching level CL, by primary connections 9,10, 11. The coarse switching level switch node 5 can establish switch connection paths 9a, . . . ,d, 10a, . . . ,d, 11a, . . . ,d at granularity N along primary connections 9, 10, 11.

Figure 1B:
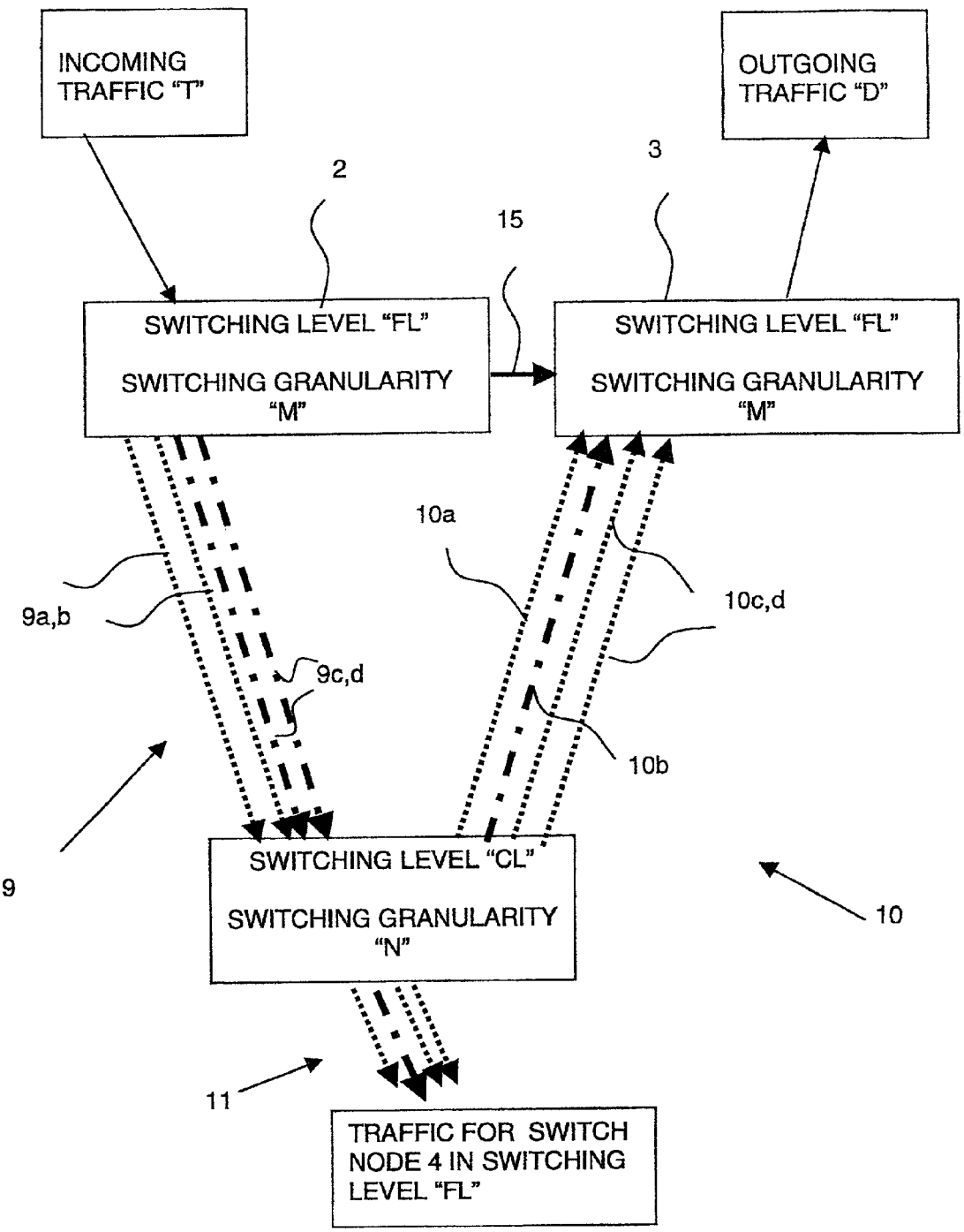
FIG. 1B shows a diagram illustrating an example of connections in a switch according to FIG. 1A.

FIG. 1B illustrates diagrammatically how switch connection(s) are established along primary connection(s) 9, 10, 11. In FIG. 1B, traffic arriving at switch node 2 is destined in part for switch node 3. The traffic arriving is equivalent to a full switch connection path to switch node 4, and more than a full switch connection path to switch node 3, but not sufficient to fill two switch connection paths to capacity. Accordingly, the traffic is routed along two switch connection paths to the coarse switching level switch node 5. Thus switch connection paths 9a, b are empty and switch connection paths 9c,d are full. The residual traffic arriving at switch node 2 which is not capable of filling a switch connection path to capacity is switched along secondary connection 15.

The switch node 5 in the coarse granularity switching level thus only performs a switching operation on traffic arriving along full switch connection paths 9c, d. Traffic arriving destined for switch node 3 is then routed along switch connection path 10b to the fine granularity switching level switch node 3. Traffic for switch node 4 is routed along a switch connection path along primary connection 11.

In the specific embodiment illustrated in FIG. 1A, each fine grain switch 6, 7, 8 is a SONET STS-1 cross-connect, and the switch node 5 includes a 2.5 Gbit/s crosspoint coarse grain switch as the switch core. Alternatively, the switch core could include an electro-optical or photonic cross-connect or an asynchronous switch matrix.

In the best mode contemplated for the invention, each permanent connection 15, 16, 17 has approximately the same capacity as the granularity N of the switch node 5. However, in alternative embodiments of the invention, the capacity of each permanent connection 15, 16, 17 in the fine granularity switching level may be different from the granularity of the switch node 5 in the coarse granularity switching level, providing the result supports the high capacity switch being non-blocking in the sense described in more detail herein below.

Each switch in one of the fine granularity switch nodes 2, 3, 4 has a capacity of 25 Gbit/s. Each switch thus has 10 Gbit/s for the external facing port(s), 10 Gbit/s for the primary connection port(s), and 2.5 Gbit/s for each of the two permanent connections connecting the switch to another switch nodes within the fine granularity switching level.

The total capacity of the coarse granularity switching level switch node 5 is 30 Gbit/s which enables up to four 2.5 Gbit/s switch connections to be established between each of the three switch nodes 2, 3, 4 in the fine granularity switching level FL.

The capacity of the high capacity non-blocking switch is thus determined by the capacity of the coarse switching level switch node 5, here 30 Gbit/s. In this embodiment therefore, a 30 Gbit/s layered switch has been provided which has a switching granularity of STS-1, (i.e. approximately 50 Mbit/s). This provides a 30/25 gain in capacity compared to the individual fine grain switches of each higher layer switch node 2, 3, 4.

In alternatively, more practical embodiments, more fine grain switches could be included within each switch node 2, 3, 4 to increase the capacity of each switch node 2, 3, 4 in the fine granularity switching level FL compared to the switching granularity of the coarse granularity switching level CL switch node 5 and/or more fine grain switch nodes used.

The operation of a layered switch according to the invention will now be described with reference to FIG. 1A and FIG. 2 of the accompanying drawings.

Consider when traffic is received by switch node 2 from port 12. When the required traffic connectivity changes, the received traffic is assessed to determine its capability to fill switch connections to capacity. The switch node in the coarse granularity switching level establishes the required number of switch connection paths along the primary connections. For example, the number of switch connection paths along primary connections 9 and 10 between the receiving switch node 2 and a destination switch node 3.

Residual traffic, being traffic which is not capable of filling a switch connection to capacity is routed by the switch node 2 along permanent connection 15 to switch node 3. Thus residual traffic remains within the fine granularity switching level and does not need to access the switch node 5 of the coarse granularity switching level. Similarly, traffic received by switch node 2 with the destination switch node 4 is either routed along switch connection paths along primary connections 9 and 11 or along permanent connection 17.

The number of switch connection paths required is reassessed as traffic is routed through the switch. Traffic is suitably monitored to determine the most efficient use of the switch connection paths established by the first switch layer switch node, and to gauge the need to switch traffic between a switch connection path and a secondary connection.

In summary therefore, traffic at the ports 12, 13, 14 in the fine granularity switching level is routed by a fine grain switch 6, 7, 8 either via switch core 5 along switch connections within primary connections 9, 10, or 11 or along secondary connection(s) 15, 16, 17. In this manner, switch 1 switches the traffic between the fine granularity ports 12, 13, 14.

Figure 2:
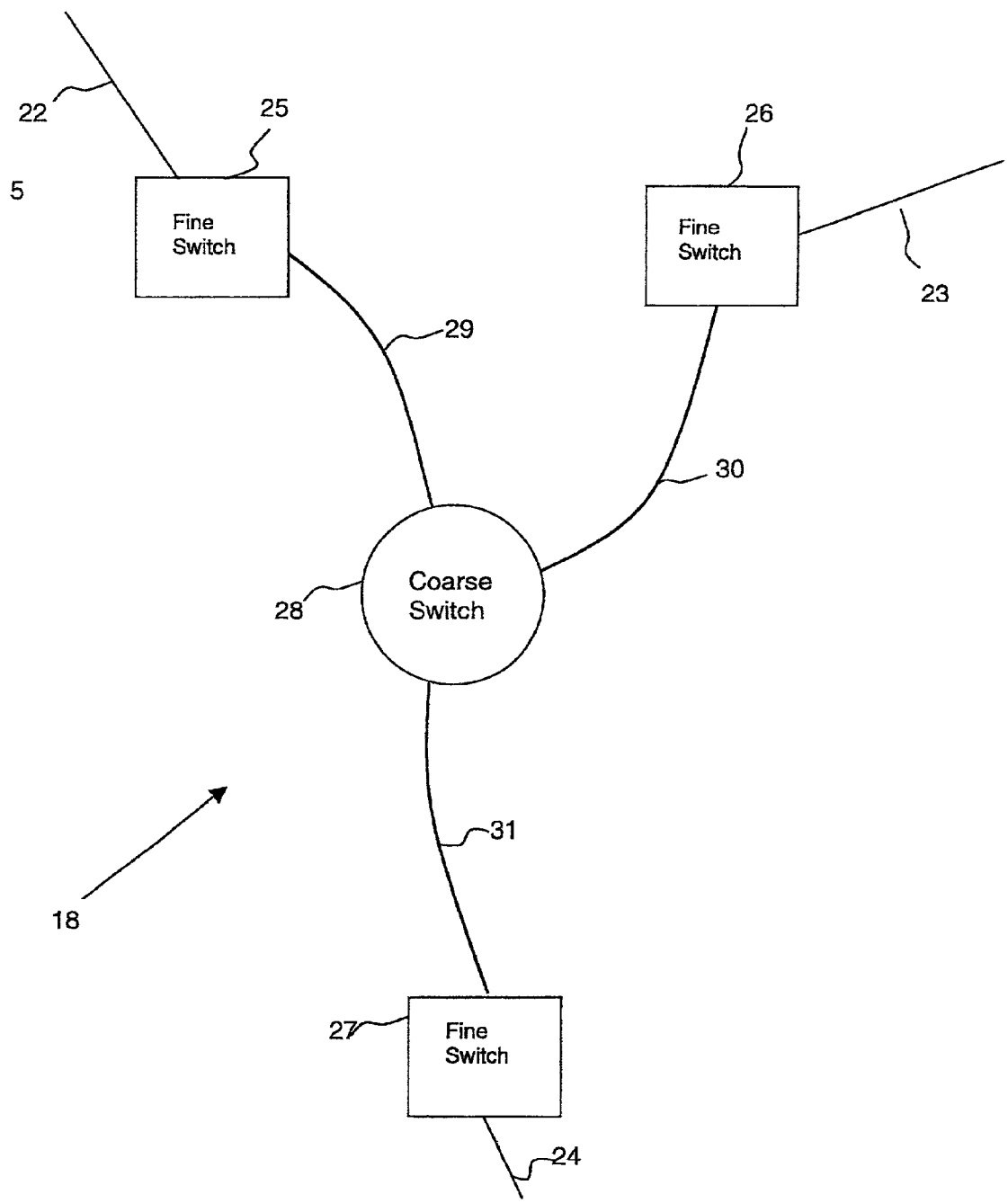
FIG. 2 is a sketch of a high capacity blockable switch.

The non-blocking configuration of the high capacity fine grain switch shown in FIG. 1A can be appreciated by contrast with a blocking high capacity fine grain switch 18 shown in FIG. 2. In FIG. 2, a high capacity fine grain switch 18 comprises a coarse grain switch connected to a number of fine grain switches. That the configuration of the switch shown in FIG. 2 is blocking is obvious to those skilled in the art. This can be demonstrated with the following example.

Referring now to FIG. 2, consider the situation where the contents of 10 Gbits/s traffic streams are to be switched between ports 22, 23, 24. The high capacity fine level switch 18 comprises switch nodes 25, 26, 27 and a switch core 28. The switch core 28 is capable of performing a coarser granularity switching operation than the switch nodes 25, 26, 27 are capable of performing.

Consider the case where the switch core 28 is an asynchronous switch with a switching granularity of 2.5 Gbits/s. The switch core 28 is capable of establishing four switch connection paths (not shown) along primary connections 29, 30, 31 to each switch node 25, 26, 27. Each primary connection can therefore comprise up to four switch connection paths, where each switch connection path has a capacity of 2.5 Gbit/s. The coarse granularity switch core thus has an overall switching capacity of 30 Gbit/s.

Traffic T arriving along port 22 consists of 10 Gbit/s of SONET STS-1s, which is 192 STS-1 s. One STS-1 traffic stream is to be switched to port 23 with the remaining traffic (191 STS-1 s) to be switched to port 24. The switch core 28 provides a switch connection path to enable the STS-1 traffic to reach switch node 26. This reduces the available bandwidth into the switch core 28 by 2.5 Gbit/s, leaving only three available switch connection paths, each having a capacity of 2.5 Gbit/s. However, 7.5 Gbit/s is insufficient to route the remaining traffic to switch node 27, and thus the high capacity fine grain switch 18 is blocked.

Referring now the high capacity fine grain switch 1 shown in FIG. 1A, in the situation where 10 Gbits/s traffic streams are to be routed between switch nodes 2, 3, 4 and the first switch layer switch node 5 includes an asynchronous switch with a switching granularity of 2.5 Gbits/s, similar traffic conditions do not block switch 1. Consider the case again where traffic T arriving at port 12 consists of 10 Gbit/s of SONET STS-1 s, or 192 STS-1 s. One STS-1 traffic stream is to be switched to port 14 with the remaining traffic (191 STS-1s) to be switched to port 13.

The coarse granularity switching level switch node 5 is capable of providing up to four switch connection paths, each switch connection having a 2.5 Gbit/s capacity, to each switch node 2, 3, 4 in the fine granularity switching level.

However, as each permanent connection 15, 16, 17 has a capacity equal to the capacity of one switch connection path, the switch is non-blocking. Switch node 2 is able to route the single STS-1 traffic stream along the permanent connection 17 to enable the single STS-1 traffic stream to reach switch node 4. As 48 STS-1s fill a 2.5 Gbit/s switch connection, the remaining 191 STS-1s are routed to switch node 3 as follows:
  i) two full switch connections along primary connections 9, 10 are established by the coarse switching level switch node 5 between the fine granularity switching level switch nodes 2 and 3, and
  ii) the residual traffic, the remaining 47 STS-1s, is routed along the permanent connection 15 between switch nodes 2 and 3.

In this way, the coarse granularity switching level switch node 5 establishes only sufficient switch connection paths to carry traffic to their full capacity, maintaining the efficiency of the switch connections. Residual traffic, i.e., further STS-1 connections which are capable of only partially filling a switch connection are routed along a secondary connection.

Thus despite the switching granularity of the switch node of the coarse granularity switching level being 2.5 Gbit/s, single STS-1 (i.e. 50 Mbit's bandwidth) traffic can be switched and not leave the switch vulnerable to blocking.

All non-broadcast connections will not block the high capacity fine granularity switch 1, providing suitable secondary connections are configured in the fine granularity switching level. This requires each secondary connection to have a capacity equal to (or greater than) the capacity of each switch connection path, and requires suitable re-routing to occur to maintain the number of switch connection paths established at a minimum.

In another, more practical embodiment of the invention, eight switch nodes are providing in the fine granularity switching level. Each fine granularity switching level switch node includes a fine grain switch which has 80 Gbit/s capacity for external facing ports. Each fine grain switch supports up to 8×4 switch connections, each switch connection having a capacity of 2.5 Gbit/s. Thus in this embodiment, the coarse granularity switching level switch node is capable of providing up to 80 Gbit/s in switch connection paths to any of the fine granularity switching level switch nodes.

Each switch node in the fine granularity switching level also has seven secondary, e.g. permanent, connections to the other switch nodes within the fine granularity switching level, each permanent connection having a capacity of 2.5 Gbit/s.

In the above embodiments of the invention, a switch in a fine granularity switching level switch node, is constructed so that traffic which requires switching between individual external facing input/output ports of the switch node can be switched directly by the relevant switch node.

Alternatively, an implementation can be realized in which each fine granularity switching level switch node comprises a first and a second part. The first part can input traffic from an external facing port and route it towards the internal part port(s) facing the coarse granularity switching level switch node. The second part can output traffic received along a switch connection towards external facing port(s).

This embodiment requires an additional connection, for example a permanent link, to be added between the two parts, and enables the capacity of the high capacity non-blocking switch to be effectively doubled in cases where the capacity of the switch is limited by the finite capacity of the fine grain switch(es) comprising each switch node in the fine granularity switching level.

In a best contemplated mode of the invention, the high capacity fine grain switch 1 is transparent to traffic type, so that both time division multiplexed traffic (TDM) traffic, for example SONET or SDH traffic, as well as wavelength traffic can be switched. In such embodimentes, at least the coarsest granularity switch node(s), e.g. the switch core, is (are) transparent to traffic type in this manner.

Figure 3:
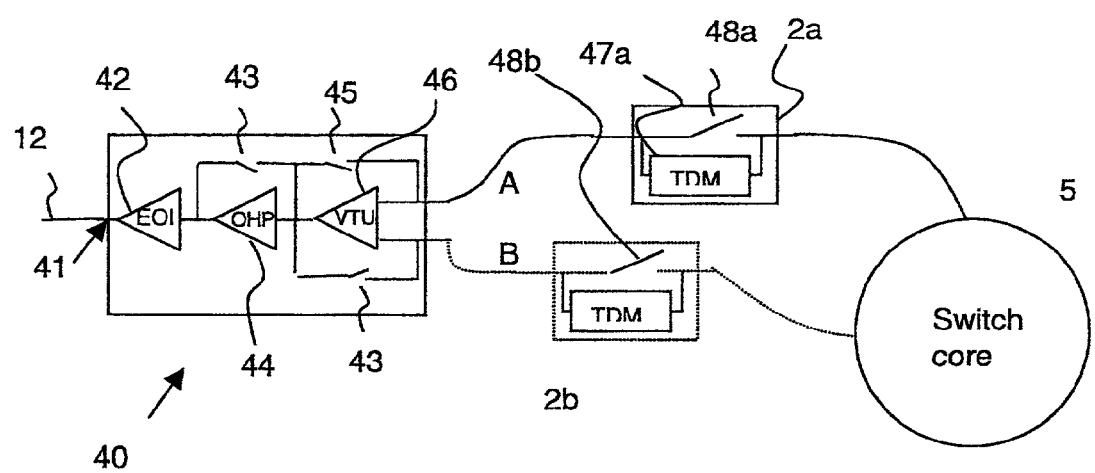
FIG. 3 is a sketch of a transparent switch node according to an embodiment of the invention.

FIG. 3 illustrates an embodiment in which both TDM and wavelength traffic can be switched when the coarse granularity switching level switch node 5 of FIG. 1 includes an optical or asynchronous electronic switch. FIG. 3 illustrates a tributary unit 40 connected to a switch node 2 (which here, for example, is shown as comprising switch 2a, and protection switch 2b) of the fine granularity switching level FL (see also FIGS. 1A and 1B for example). Other tributary units connected to the coarse granularity switching level switch node 5 are not shown for clarity.

In FIG. 3, the switch node 2 traffic and equipment protection is supported by providing two fine grain switches 48a and 48b. External facing port 12 supports traffic T which is routed through the tributary unit 40 via access port 41. Traffic T is assumed to be on an optical fiber and may contain a signal which is a SONET TDM multiplexed signal or which is a signal being transported transparently on a wavelength of light. Within the tributary unit 40, electronic data is converted into optical data by a suitable electro-optical interface (EOI) 42. A switch 43 enables data to bypass the SONET overhead processor (OHP) 44 if SONET processing is not required.

FIG. 3 supports both path and/or equipment protection. In FIG. 3 it is assumed that the coarse granularity switching level switch node 5 incorporates appropriate protection measures. Thus switch node 2 and the connections from switch node 2 to the tributary unit 40 are shown in duplicate to illustrate the path protection. For equipment protection, user input traffic is broadcast from the input 41 over both routes A and B. At the output for both transparent signals and non-path protected SONET signals, switches 43, 45 select from either route A or route B. In this way equipment failures on a single route do not impair the switching operation. For transparent signals, the fine grain switches in 2a (47a) and in 2b are bypassed. This is illustrated by switch 48a in 2a.

In SONET and SDH networks a technique called path protection may be used, in which, a single STS-1 may be broadcast over two different routes across a city, a country or even further. At the point where the signal leaves the network or joins another network, the signal exhibiting the best required characteristics is selected. In the embodiment illustrated in FIG. 2, VTU 46 performs appropriate signal selection.

The invention thus enables the switch node to bypass SONET processing, and so retain the ability to use the native capability of the coarse grain switch incorporated in the switch node of the first switch layer.

The high capacity fine grain 1 may support a purely optical network in one embodiment of the invention. Referring again to FIG. 1A, in this embodiment of the invention each switch node 2, 3, 4 in the fine granularity switching level incorporates a fine grain wavelength switch and the first layer switch node is a coarse grain photonic switch, for example, a MEMS-type device.

Figure 4:
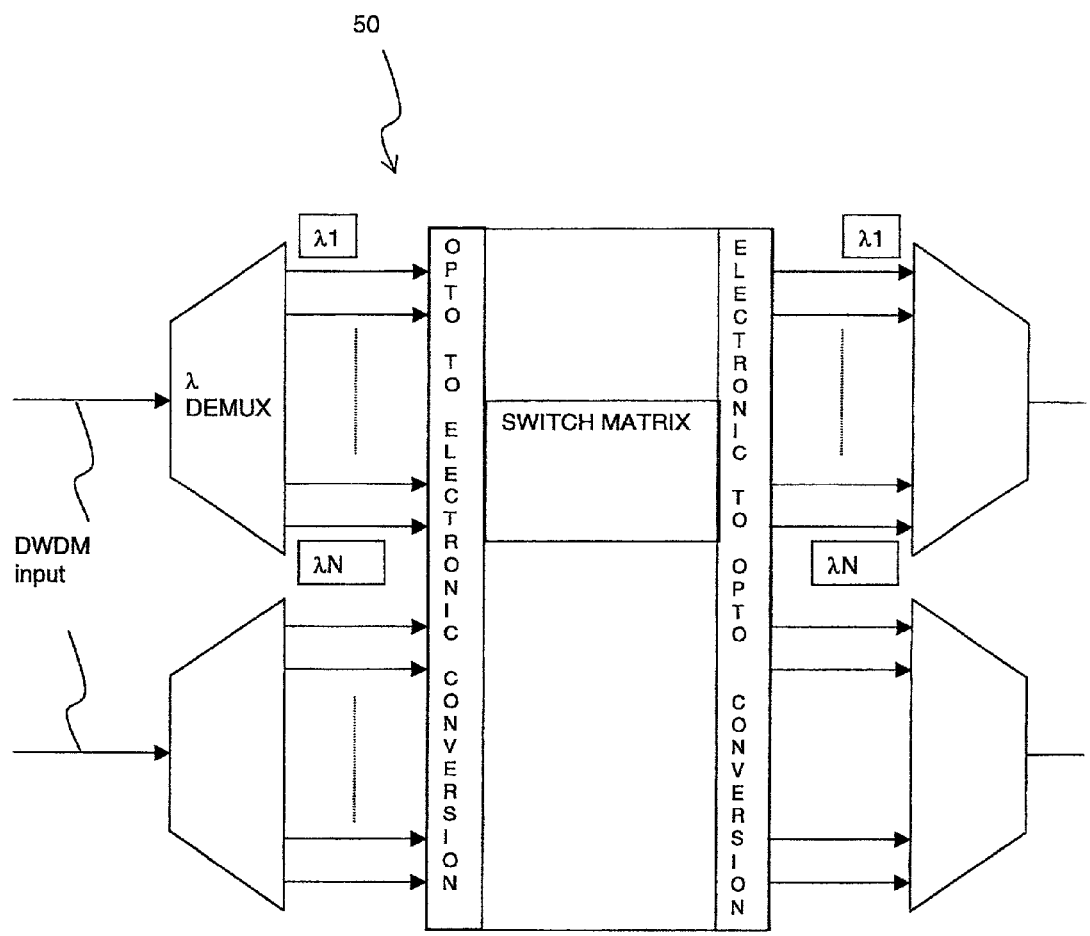
FIG. 4 is a sketch of a wavelength switch incorporated in a switch node according to another embodiment of the invention.

Referring now to FIG. 4, a typical wavelength switch 50 suitable for incorporation into a higher layer switch node 2, 3, 4 is sketched. The wavelength switch 50 is able to switch a signal on any incoming wavelength to the same or a different output wavelength. FIG. 4 illustrates how the DWDM (Dense Wavelength Division Multiplexed) signal input to the wavelength switch 50 contains a number N of different wavelength $\lambda$ input signals per fiber.

However, a coarse grain photonic switch is only capable of switching all the light along any given input to an output, i.e., all wavelengths received along a switch connection path from a switch node in the adjacent fine granularity switching level are switched together to another switch connection path to another switch node in the adjacent fine granularity switching level.

Switching matrix sizes in both photonic and wavelength switches of about 1000 ports are known. Each fiber may support up to 40 signals each using a different wavelength. Therefore each fine grain wavelength switch is limited to switching the signals inside only about 25 fibers. A switch constructed to have an architecture as indicated by FIG. 1A therefore permits much larger non-blocking wavelength switches to be provided.

A method of routing traffic through a high capacity fine grain switch such as FIG. 1A illustrates will now be discussed. As new connections to the high capacity fine grain switch 1 are required, which may be initiated by management or signaling systems, a suitable connection control mechanism establishes an appropriate route through the switch 1. The connection control mechanism may be implemented in any suitable manner, by any conventional or state-of-the art means. Traffic routed over the switch is monitored as in order to avoid blocking, it is necessary that a switching level coarse granularity switch only connects full switch connection paths and for residual amounts of traffic to be routed along secondary connections.

The dynamic nature of traffic requires a means to reroute traffic as traffic levels rise and fall either along a secondary connection or along a switch connection path. To ensure that the secondary connections only carry residual amounts of traffic, suitable traffic management control is implemented at each switch node to reroute traffic as appropriate. Means to control routing is implemented either by the high capacity fine grain 1, first layer switch node, the higher layer switch nodes 2, 3,4 and/or by a suitable network management system. In the event traffic decreases in one of the switch connection paths 9, 10, 11, a proportion of traffic from one of the switch connection paths 15, 16 or 17 is re-routed to maintain the switch connection path full.

Figure 6:
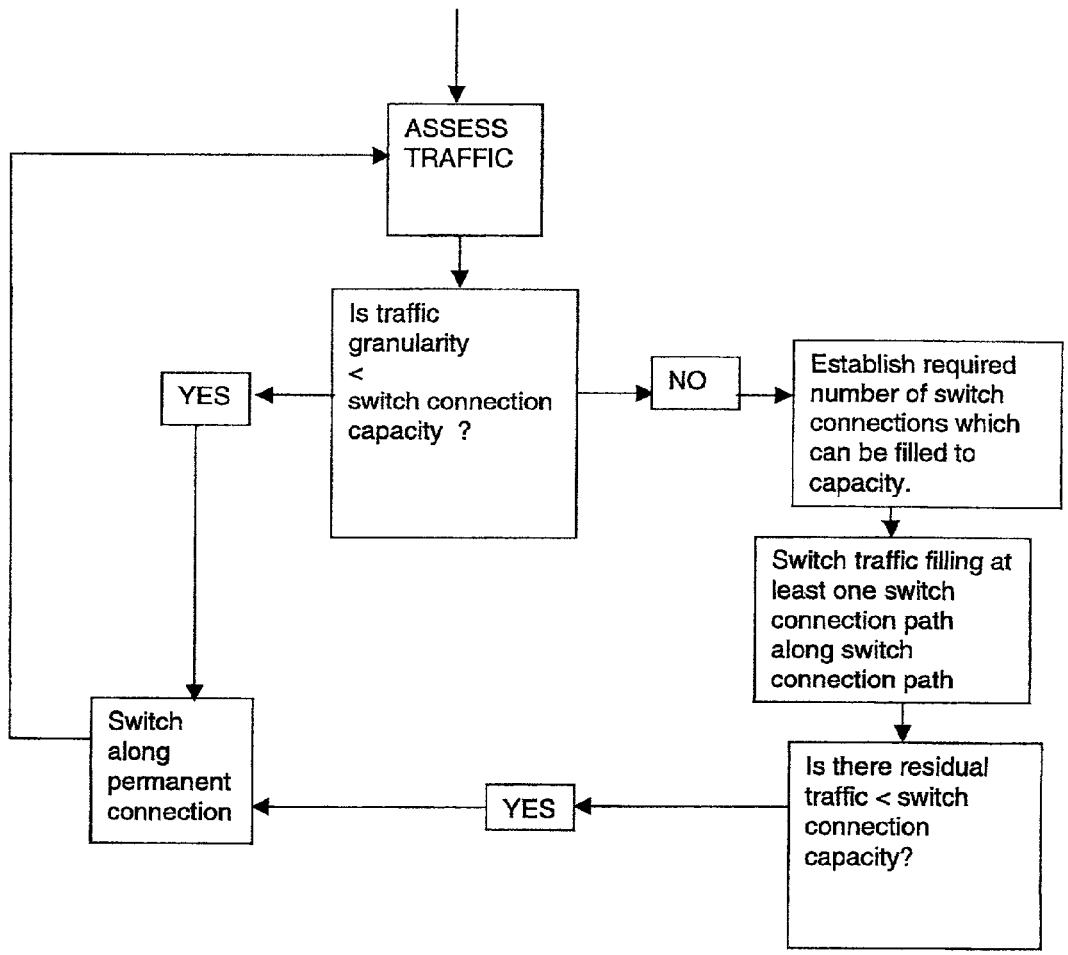
FIG. 6 sketches a traffic routing method according to a second aspect of the invention.

The switch nodes of the fine granularity switching level work together to maintain each switch connection path full or empty by shuffling traffic to and from the secondary connections 15, 16, 17. FIG. 6 illustrates how traffic is assessed to maintain only switch connection path(s) which are full to capacity or empty and how residual traffic is routed along the secondary connections.

As FIG. 6 indicates, since the above 'shuffling' affects established switch connection paths, it must be accomplished in a manner which does not cause any errors in the traffic stream. Any suitable technique can be used, for example, hitless rollover. Using such a technique, a higher layer switch node 2, 3, 4 broadcasts the traffic to be rolled along both the secondary connection and the switch connection path to the destination switch node in the fine granularity switching level.

The destination switch node then selects to input the traffic from the new route instead of the old. Once the selection has been made, the source switch node stops sending the traffic on the original route. In order for the selection to be 'hitless', the traffic streams arriving on the two routes must be exactly in phase. Appropriate mechanisms are provided by any suitable conventional mans to minimize the delay difference along the two routes, together with a suitable mechanism for measuring and adjusting the actual delay.

For example, in a SONET/SDH embodiment of the invention, where an asynchronous coarse grain switch is incorporated in a coarsest granularity switching level switch node, the switch node should introduce negligible extra delay and cable length differences will provide the dominant delay contribution. The defined frame pattern in SONET/SDH enables the delay factor to be recognized and electronic memory (elastic stores) are able to buffer signals to automatically adjust the delay. In the best mode contemplated, the finer granularity switching level switch nodes incorporate fine grain switches which are suitably synchronized across all finer granularity switching levels.

In a wavelength switching application, the same basic hitless rollover technique could be used. The recent standardization by ITU G.709 ensures that a suitable recognizable framing pattern is present on all wavelength signals, it is therefore necessary to adjust the delay of one signal relative to another until the framing patterns line up sufficiently. Such adjustment can be accomplished using materials whose refractive index can be varied in a controlled manner, such as by varying their temperature.

In some applications, the absolute size of the high capacity fine grain switch may require the coarse granularity switching level switch node to incorporate a coarse grain switch with extremely large granularity.

For example, a coarse granularity switching level switch node incorporating a coarse grain switch with 2.5 Gbit/s switching granularity requires each permanent connection in the next finer granularity switching level to have a 2.5 Gbit/s capacity to avoid blocking. Each switch node in the switching level providing the next finer granularity switching operation must support a number of switch connections inside the 2.5 Gbit/s primary connections to the coarse granularity switching level switch node 5 and a secondary connection of 2.5 Gbit/s to each of the other switch nodes in the same switching level.

Accordingly, each switch node therefore is restricted to a certain minimum size of fine grain switch(es), and the permanent connections to other fine grain switch(es) (whether within the switch node or to the fine grain switch(es) of other switch nodes in the same switching level) occupy some of the switch capacity, and therefore represent some inefficiency.

Figure 5A:
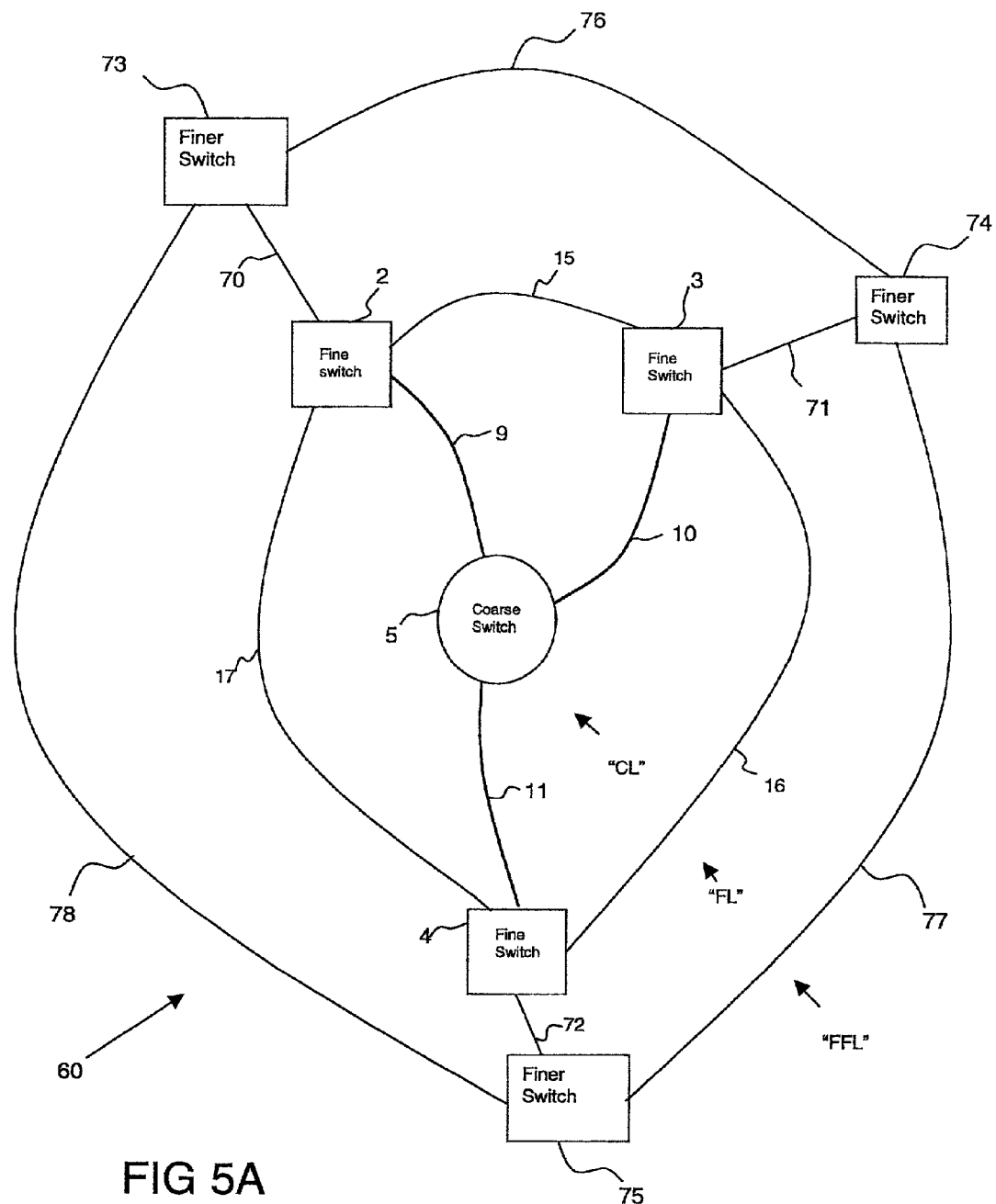
FIG. 5A sketches a switch having three different granularity switching levels according to another embodiment of the invention.
Figure 5B:
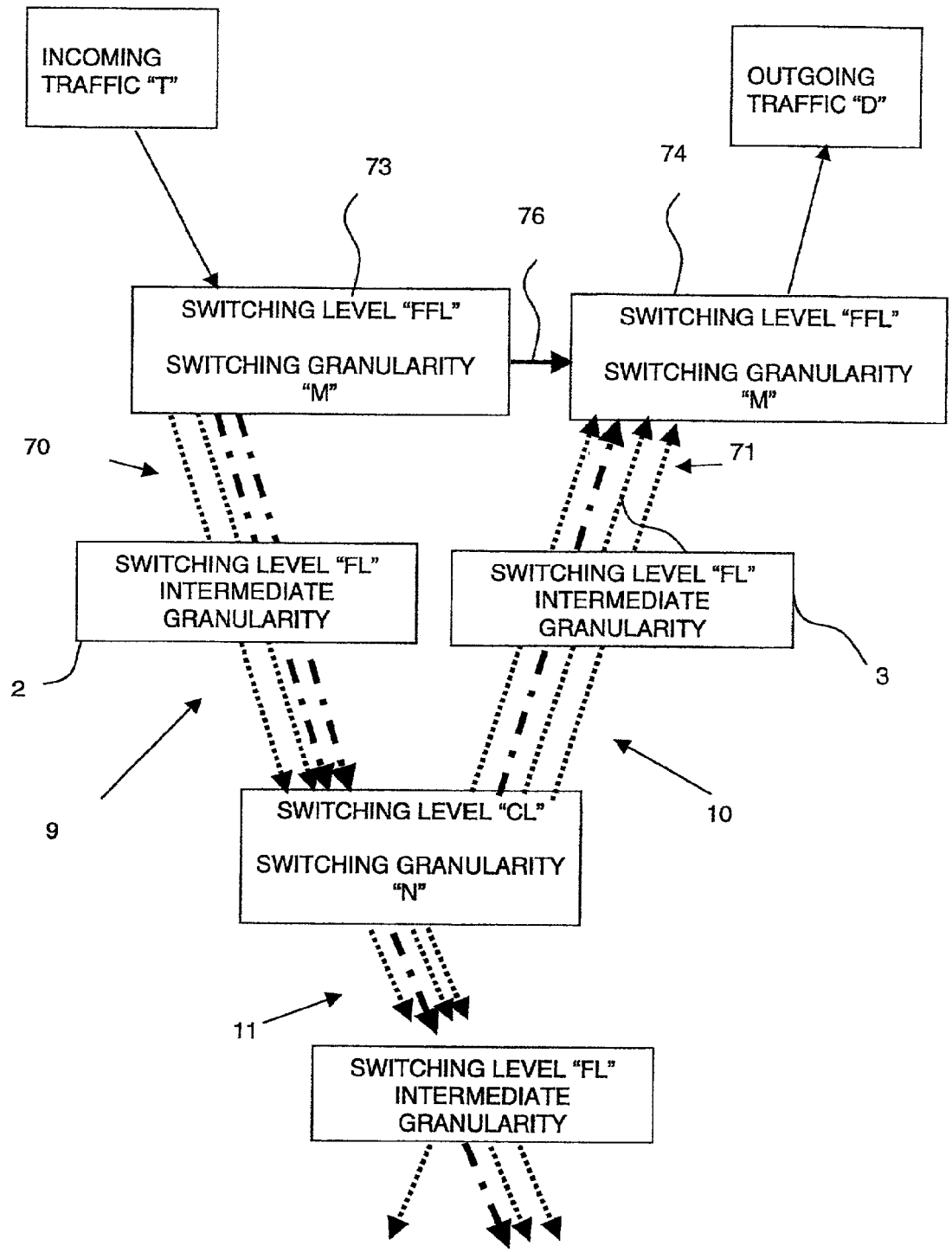
FIG. 5B shows a diagram illustrating an example of connections in a switch according to FIG. 5.

To overcome this, additional fine granularity switching levels may be added, for example, such as the three layer non-blocking high capacity fine grain switch 60 sketched in FIGS. 5A and 5B. In FIGS. 5A and 5B, an additional level of switching granularity has been provided. This is represented by the third switch layer FFL. In FIG. 5A, the third switching level FFL incorporates switch nodes 73,74,75. Each switch node 73,74,75 has a switch providing a finer granularity switching operation than that which is provided in the middle granularity switching level FL by the fine granularity switches incorporated in each switch node 2, 3, 4.

The switch nodes of the finest granularity switching level FFL (i.e., the third layer in FIG. 5A) determine the granularity of the high capacity fine grain as a whole. As FIG. 5A illustrates, within the finest granularity switching level FFL, secondary connections 76, 77, 78 are provided to interconnect the switch nodes 73, 74, 75 of that switching level. Such secondary connections are permanent connections, as are the secondary connections 15, 16, 17 within the second layer in FIG. 5A (representing the intermediate granularity switching level FL) in the best mode contemplated for the invention.

The different levels of switching granularity are interconnected by primary connections 9, 10, 11, 70, 71, 72 between the switch node(s) of the interconnected levels. The capacity of each switch connection formed along a primary connection between two levels of switching granularity is determined by the coarser granularity switching operation supported by a switch node in the coarser of the two interconnected switching levels. Each switch node in the coarser of two inter-connected switching levels can establish at least one switch connection path to a switch node in the finer switching level.

Thus switch connection paths can be established by the switch node 5 along appropriate primary connections 9, 10, 11 to the switch nodes 2, 3, 4 in the next finer granularity switching level FL. Switch connection paths can be established by switch node 2 in the finer granularity switching level FL to the next finer granularity switching level FFL switch node 76 along primary connection 70. Similarly, switch nodes 3, 4 can establish switch connections along primary connections 71,72 to switch nodes 74, 75 respectively.

In FIG. 5A, the first switching level CL is represented as the innermost layer and comprises a switch node 5 incorporating a switch core capable of switching traffic at the coarsest switching granularity or largest bandwidth. The second switching level FL is represented as the intermediate layer. Each of the intermediate layer switch nodes 2, 3, 4, incorporate switch(es) capable of switching narrower bandwidths than the switch node 5. The third switching level FFL is represented as the outermost layer. Each of the outer layer switch nodes 73, 74, 75 incorporate switch(es) which are capable of switching narrower bandwidths than the switch nodes 2, 3, 4 of the intermediate layer.

In this manner, therefore, the switching operation of the switching levels can be successively nested so progressively narrower bandwidth traffic can be switched yet the overall capacity of the switch retained. In other embodiments, therefore, successively finer granularity switching levels can be added to the switch, and the switching granularity made even finer. Each successive switching level having at least one switch node which incorporates switch(es) of even finer granularity than the switches in the switch nodes of the previous level.

The outmost "layer" of the overall switch as FIG. 5A illustrates, thus provides the finest granularity switching level and contains switch node(s) which incorporate the finest granularity switch(es). The granularity of the finest granularity switching level thus determines the switching granularity of the high capacity fine grain switch as a whole. This 'nesting' of the switch layers enables extremely large switches to be supported which are also capable of switching appropriately fine grain traffic.

A three switching level high capacity fine grain switch 60 such as is sketched in FIG. 5A, can comprise a 2.5 Gbit/s asynchronous switch within switch node 5, SONET STS-1 switches within the switch nodes 2, 3,4 and SONET lower order container (VT) switches within the switch nodes 73, 74, 75.

The switch node 5 would be capable of establishing 2.5 Gbit/s switch connection path(s) to each switch node 2, 3, 4 in the next finer granularity switching level FL. Each secondary connection within the finer granularity switching level FL has a capacity of 2.5 Gbit/s to ensure the finer granularity switching level FL and the coarse granularity switching level CL were non-blocking.

Each switch node 2, 3, 4 in the finer granularity switching level FL is capable of establishing a switch connection path with at least one switch node 73, 74, 75 in the next, finest granularity switching level FFL along a primary connection 70, 71, 72. Within the finest granularity switching level FFL, secondary permanent connections 76, 77, 78 interconnect the switch nodes 70, 71, 72. Each secondary permanent connection 76, 77, 78 has a capacity of an STS-1 (approximately 50M bit/s).

Numerous modifications and variations to the features described above in the specific embodiments of the invention will be apparent to a person skilled in the art. The scope of the invention is therefore considered not to be limited by the above description but is to be determined by the accompanying claims.

For example, it will be obvious to a person skilled in the art that not all switch nodes within a switching level may need to be connected to each other, and that the switches in each switch node surrounding a switch core may not all be identical, for example, within a single granularity switching level, each switch node may support a different type of switch. Moreover, there need not be one-to-one correspondence between the number of switch nodes in different switching levels. For example, it may be that within a finer switching level more switch nodes are provided than within the next coarser switching nodes.

Whilst the switches illustrated demonstrate a layered architecture, physical devices may not necessarily implement such a structure. Moreover, the switch may be distributed over the network with switch nodes remotely located or have switch nodes co-located in the same vicinity as each other.

Other variations and modifications which will be apparent to those skilled in the art include embodiments of the invention which enable switching at a certain switching level, for example, the finest switching level, to be bypassed and for traffic to proceed to the next, coarser granularity switching level. Also, traffic in a high capacity fine grain switch which has at least three levels of switching granularity may be routed along a combination of a secondary connection(s) and along primary connection(s). The route implemented may be determined by the local traffic conditions at each switch node. In such embodiments, establishing a switch path connection may be construed as establishing a path which includes routing traffic along a secondary connection as well as along a primary connection, or only along a primary connection, as appropriate and as would be apparent to a person skilled in the art.

What is claimed is:

1. A high capacity switch for switching communications traffic, the high capacity switch having:
   a plurality of differing granularity switching levels, each switching level having at least one switch node capable of performing a switching operation at the granularity of the switching level; and
   at least two primary connections, each connecting one of the switching levels to another one of the switching levels, wherein
   at one of the switching levels, at least one switch node is capable of switching communications traffic along at least one switch connection path established along one of the primary connections, to fill it to a predetermined level, and is capable of switching communications traffic which is not able to fill such a path to the predetermined level, along at least one secondary connection to another switch node within the same switching level.

2. A high capacity switch for switching communications traffic as claimed in claim 1, wherein the pre-determined level is the maximum traffic capacity of the switch connection path.

3. A high capacity switch for switching communications traffic as claimed in claim 1, wherein each at least one secondary connection is configured to have a traffic capacity so that the high capacity switch is non-blocking.

4. A high capacity switch for switching communications traffic as claimed in claim 1, wherein at least one secondary connection comprises a permanent connection.

5. A high capacity switch for switching communications traffic as claimed in claim 1, wherein every secondary connection comprises a permanent connection.

6. A high capacity switch for switching communications traffic as claimed in claim 1, wherein one of the switching levels which performs the coarsest granularity switching operation has one switch node.

7. A high capacity switch for switching communications traffic as claimed in claim 1, wherein each switch node in one of the switching levels comprises a plurality of switches, each switch being capable of operating at the granularity of the one of the switching levels.

8. A high capacity switch for switching communications traffic as claimed in claim 1, wherein the traffic capacity of the at least one secondary connection in a first one of the switching levels is determined by the capacity of the at least one switch connection path to a second, coarser, one of the switching levels which is capable of providing a coarser granularity switching operation than the first one of the switching levels.

9. A high capacity switch for switching communications traffic as claimed in claim 1, wherein the traffic capacity of the at least one secondary connection in a first one of the switching levels is substantially the same as the capacity of the at least one switch connection path to a second one of the switching levels which is capable of providing a coarser granularity switching operation than the first one of the switching levels.

10. A high capacity switch for switching communications traffic as claimed in claim 1, wherein the traffic capacity of the at least one secondary connection in a first one of the switching levels is larger than the capacity of the at least one switch connection path to a second one of the switching levels which is capable of providing a coarser granularity switching operation than the first one of the switching levels.

11. A high capacity switch for switching communications traffic as claimed in claim 1, having two differing granularity switching levels.

12. A high capacity switch for switching communications traffic as claimed in claim 1, having three differing granularity switching levels.

13. A high capacity switch for switching communications traffic as claimed in claim 1, having more than three differing granularity switching levels.

14. A high capacity switch for switching communications traffic as claimed in claim 1, wherein the high capacity switch has two differing granularity switching levels, the traffic capacity of the at least one secondary connection in a one of the switching levels providing a finer granularity switching operation may be approximately equal to the granularity of a switching operation in a one of the switching levels providing a coarser granularity switching operation.

15. A high capacity switch for switching communications traffic as claimed in claim 1, wherein the high capacity switch has three different granularity switching levels, the traffic capacity of the at least one secondary connection in one of the switching levels providing a finest granularity switching operation may be approximately equal to the granularity of a switching operation in one of the switching levels providing an intermediate granularity switching operation, and the traffic capacity of the at least one secondary connection in the one of the switching levels providing an intermediate granularity switching operation may be approximately equal to the granularity of the switching operation of in one of the switching levels providing a coarsest granularity switching operation.

16. A high capacity switch for switching communications traffic as claimed in claim 1, wherein the high capacity switch is capable of switching traffic which is coarser than the granularity of the switching operation provided by a switch node in a first one of the switching levels by routing traffic through to a second one of the switching levels which is capable of providing a coarser granularity switching operation than the operation provided by the first one of the switching levels.

17. A high capacity switch for switching communications traffic as claimed in claim 1, wherein at least one switch node of a one of the switching levels which provides the coarsest granularity switching operation is capable of establishing at least one secondary connection between a pair of switch nodes in a second one of the switching levels which provides a finer granularity switching operation.

18. A high capacity switch for switching communications traffic as claimed in claim 1, wherein at least one secondary connection is provided externally to a one of the switching levels which provides the coarsest granularity switching operation.

19. A high capacity switch for switching communications traffic as claimed in claim 1, wherein the switch node of a one of the switching levels which provides the coarsest granularity switching operation includes an optical switch.

20. A high capacity switch for switching communications traffic as claimed in claim 1, wherein the switch node of a one of the switching levels which provides the coarsest granularity switching operation is arranged to switch traffic of more than one multiplexing type.

21. A high capacity switch for switching communications traffic as claimed in claim 1, wherein the high capacity switch is capable of switching both time division multiplexed traffic and wavelength multiplexed traffic.

22. A high capacity switch for switching communications traffic as claimed in claim 1, wherein the high capacity switch is capable of switching SONET/SDH traffic.

23. A high capacity switch for switching communications traffic as claimed in claim 1, wherein the high capacity switch is capable of switching both SONET/SDH and wavelength traffic.

24. A high capacity switch for switching communications traffic as claimed in claim 1, wherein at least one switch node is capable of switching a lower order SDH/SDH virtual, container.

25. A high capacity switch for switching communications traffic as claimed in claim 1, wherein at least one switch node is capable of switching higher order SDH/SDH virtual containers.

26. A high capacity switch for switching communications traffic as claimed in claim 1, wherein at least one switch node is capable of switching a plurality of higher order SDH/SDH containers.

27. A high capacity switch for switching communications traffic as claimed in claim 1, wherein at least one switch node in one of the plurality of switching levels is capable of switching lower order virtual containers, and at least one other switch node in another of the plurality of switching levels is capable of switching higher order virtual containers.

28. A high capacity switch for switching communications traffic as claimed in claim 1, wherein the high capacity switch according has at least three switching levels, at least one switch node in a first one of the plurality of switching levels may be capable of switching lower order virtual containers, and at least one switch node in a second one of the plurality of switching levels may be capable of switching higher order virtual containers, and at least one switch node in a third one of the plurality of switching levels may be capable of switching a plurality of higher order virtual containers.

29. A high capacity switch for switching communications traffic as claimed in claim 1, wherein the high capacity switch is distributed over a communications network.

30. A high capacity switch for switching communications traffic as claimed in claim 1, wherein the high capacity switch is incorporated into a telecommunications network.

31. A high capacity switch for switching communications traffic as claimed in claim 1, wherein the switch is capable of bypassing traffic routed through the switch through a first one of the switching levels so that the traffic is switched by a second one of the switching levels capable of performing a coarser granularity switching operation than the first one of the switching levels.

32. A high capacity switch for switching communications traffic as claimed in claim 1, wherein the switch is capable of bypassing traffic routed through the switch through the at least one switch node of a first one of the switching levels so that the traffic is switched by one of the at least one switch nodes in a second one of the switching levels capable of performing a coarser granularity switching operation than the first one of the switching levels.

33. A switch of granularity M comprising:
a switch core including a coarse grain switch of granularity N;
a plurality of switch nodes, each switch node comprising at least one fine grain switch of granularity M finer than N, the switch core being capable of establishing a switch connection path with any of the switch nodes; and a plurality of permanent connections, each permanent connection connecting two fine grain switches, wherein the permanent connections are configured to permit the switch to be non-blocking, and wherein a minimum number of switch connection paths are established, the switch connections being filled to capacity with traffic routed through the switch and wherein residual traffic is routed along permanent connections.

34. A switch of granularity M as claimed in claim 33, wherein the traffic capacity of each permanent connection between any pair of fine grain switches substantially equals to the granularity N of the coarse grain switch.

35. A method of controlling traffic to be routed through a high capacity switch, the method comprising the steps of:

assessing traffic received at a switch node in a finer granularity switching level;

at the switch node in the finer granularity switching level, switching traffic capable of filling to capacity an exact number of switch connections along a primary connection along the exact number of switch connections to a next coarser granularity switching level switch node, switching residual traffic not capable of filing a switch connection to capacity along a secondary connection to another switch node in the finer granularity switching level; and reconfiguring the number of switch connections established in accordance with any variation in the traffic to ensure that a minimum number of switch connections is always established from the finer granularity switching level to the next coarser granularity switching level.

36. A method as claimed in claim 35, wherein the step of reconfiguring uses a hitless technique.

37. A method as claimed in claim 35, wherein the step of reconfiguring maintains the synchronization of traffic at a destination.

38. A communications network including a high capacity switch for switching communications traffic, the high capacity switch having:

a plurality of differing granularity switching levels, each switching level having at least one switch node capable of performing a switching operation at the granularity of the switching level; and at least two primary connections, each connecting one of the switching levels to another one of the switching levels, wherein at one of the switching levels, at least one switch node is capable of switching communications traffic along at least one switch connection path established along one of the primary connections, to fill it to a predetermined level, and is capable of switching communications traffic which is not able to fill such a path to the predetermined level, along at least one secondary connection to another switch node within the same switching level.

39. A switch node forming part of a high capacity switch for switching communications traffic, the high capacity switch having:

a plurality of differing granularity switching levels, each switching level having at least one switch node capable of performing a switching operation at the granularity of the switching level; and at least two primary connections, each connecting one of the switching levels to another one of the switching levels, wherein at one of the switching levels, at least one switch node is capable of switching communications traffic along at least one switch connection path established along one of the primary connections, to fill it to a predetermined level and is capable of switching communications traffic which is not able to fill such a path to the predetermined level, along at least one secondary connection to another switch node within the same switching level.

* * * * *